United States Patent
Naito et al.

(10) Patent No.: US 11,279,097 B2
(45) Date of Patent: Mar. 22, 2022

(54) LAMINATED BASE MATERIAL AND METHOD OF MANUFACTURING FIBER-REINFORCED PLASTIC

(71) Applicant: Toray Industries, Inc., Tokyo (JP)

(72) Inventors: Yuta Naito, Iyo-gun (JP); Yuzo Fujita, Iyo-gun (JP); Ichiro Taketa, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 316 days.

(21) Appl. No.: 16/063,416

(22) PCT Filed: Dec. 14, 2016

(86) PCT No.: PCT/JP2016/087213
§ 371 (c)(1),
(2) Date: Jun. 18, 2018

(87) PCT Pub. No.: WO2017/110616
PCT Pub. Date: Jun. 29, 2017

(65) Prior Publication Data
US 2019/0001586 A1    Jan. 3, 2019

(30) Foreign Application Priority Data

Dec. 25, 2015  (JP) .............................. JP2015-253489

(51) Int. Cl.
*B29C 70/08*    (2006.01)
*B29C 70/30*    (2006.01)
(Continued)

(52) U.S. Cl.
CPC ............. *B29C 70/081* (2013.01); *B29C 70/08* (2013.01); *B29C 70/14* (2013.01); *B29C 70/20* (2013.01);
(Continued)

(58) Field of Classification Search
CPC ..... B29C 70/081; B29C 70/20; B29C 70/205; B29C 70/14; B29C 70/202; B29C 70/08;
(Continued)

(56) References Cited

FOREIGN PATENT DOCUMENTS

JP    2007-146151 A    6/2007
JP    2008-207544 A    9/2008
(Continued)

OTHER PUBLICATIONS

Machine Translation of JP 2008-207544 A. (Year: 2008).*
Machine Translation of JP 2009-062474 A. (Year: 2009).*

*Primary Examiner* — Brian Handville
(74) *Attorney, Agent, or Firm* — DLA Piper LLP (US)

(57) ABSTRACT

A substantially flat-plate-shaped laminated base material has at least a layer-shaped body α and a layer-shaped body β are layered or disposed side by side, the layer-shaped body α having one or more cut prepregs A in which reinforcing fibers oriented in one direction are impregnated with a resin composition, the volume fraction of fiber is 45-65%, and at least a portion of the reinforcing fibers are segmented into a fiber length of 10-300 mm by a plurality of cuts, and the layer-shaped body β having one or more base materials B in which reinforcing fibers having a fiber length in the range of 10-300 mm are impregnated with a resin composition.

25 Claims, 8 Drawing Sheets

(51) Int. Cl.
  *B29C 70/54* (2006.01)
  *C08J 5/24* (2006.01)
  *B32B 5/26* (2006.01)
  *B29C 70/20* (2006.01)
  *B29C 70/14* (2006.01)
  *B29C 70/34* (2006.01)

(52) U.S. Cl.
  CPC .......... *B29C 70/202* (2013.01); *B29C 70/205* (2013.01); *B29C 70/30* (2013.01); *B29C 70/345* (2013.01); *B29C 70/545* (2013.01); *B32B 5/26* (2013.01); *C08J 5/24* (2013.01); *B29C 2793/0054* (2013.01); *B32B 2250/20* (2013.01); *C08J 2363/00* (2013.01)

(58) Field of Classification Search
  CPC ..... B29C 70/545; B29C 70/30; B29C 70/345; B29C 2793/0054; B29C 70/34; B32B 5/26; B32B 2250/20; C08J 5/24; C08J 2363/00
  See application file for complete search history.

(56) References Cited

FOREIGN PATENT DOCUMENTS

| | | |
|---|---|---|
| JP | 2009-062474 A | 3/2009 |
| JP | 2010-018724 A | 1/2010 |
| JP | 2014-172267 A | 9/2014 |
| WO | 2013/094706 A1 | 6/2013 |
| WO | 2015/083707 A1 | 6/2015 |
| WO | 2016/043156 A1 | 3/2016 |

* cited by examiner

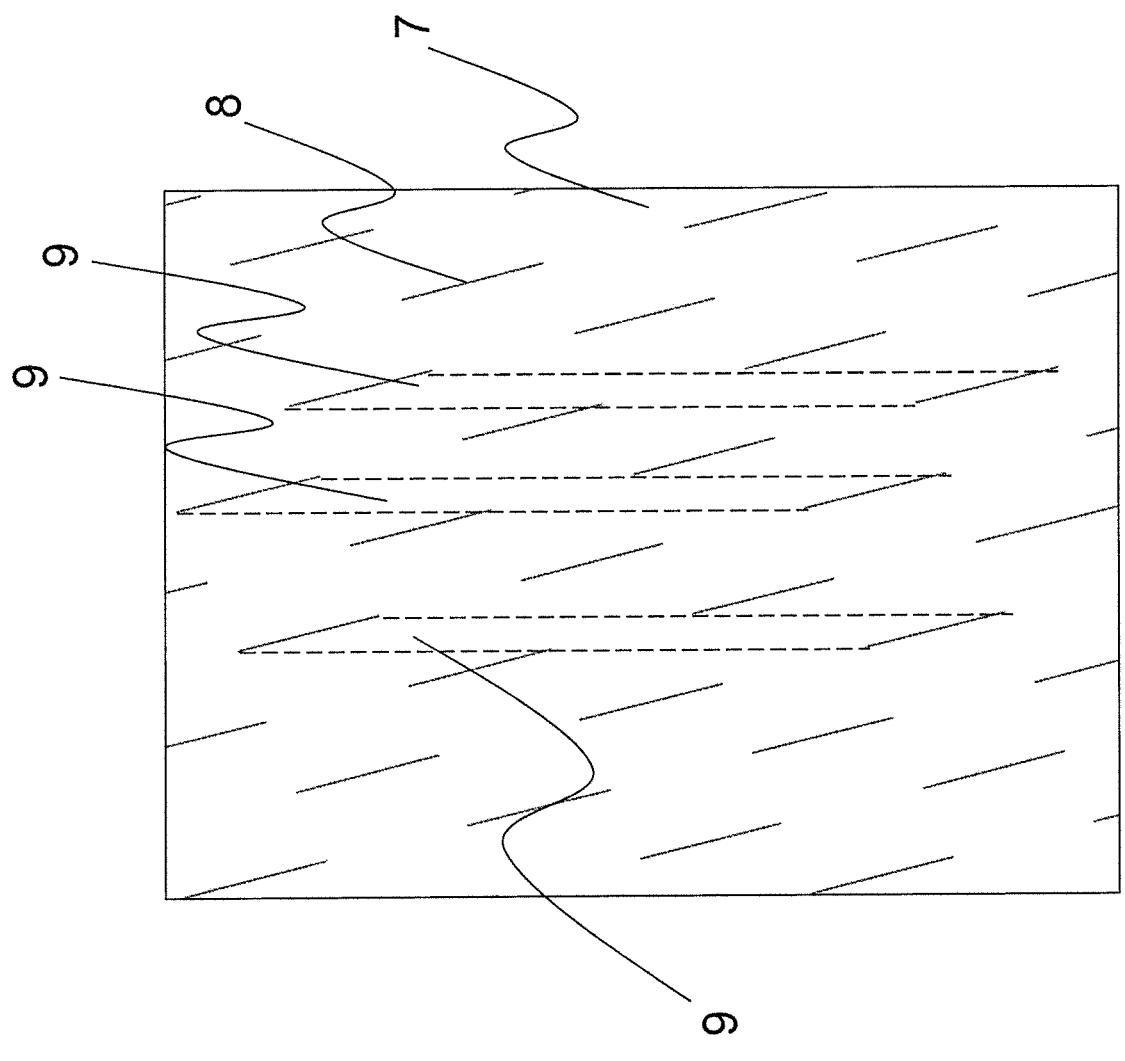
Figure 5
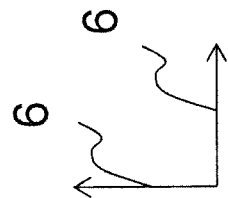

LAMINATED BASE MATERIAL AND METHOD OF MANUFACTURING FIBER-REINFORCED PLASTIC

TECHNICAL FIELD

This disclosure relates to a method of manufacturing a fiber reinforced plastic material having excellent shape conformity to complicated shapes and exhibiting excellent mechanical properties and excellent molding quality when molded into a fiber reinforced plastic material.

BACKGROUND

Fiber reinforced plastic materials generally have a high specific strength, high specific modulus, good mechanical properties, and good functional properties such as high weather resistance and chemical resistance and accordingly, they are drawing attention in various industrial fields, with demand for them mounting every year.

As plies for production of fiber reinforced plastic material with good mechanical properties, sheets of semi-cured intermediate called a prepreg, which is basically composed of reinforcement fibers impregnated with matrix resin, are generally used. To process a stack of these piles into a three-dimensional shape, there are generally known methods including the hand lay-up method in which prepreg sheets are pressed against a mold to obtain a molded shape and the press molding method in which a plate-like flat stack of prepreg plies is sandwiched between mold halves and pressed while heating in a hot press apparatus. However, since the reinforcement fibers are in the form of continuous fibers, there is the problem of difficulty in shaping into three dimensional or other complicated shapes.

SMC (sheet molding compound) is a good base material suitable for producing three dimensional products. A typical SMC is a laminated base material in which chopped strands of about 25 mm impregnated with a thermosetting resin are randomly distributed, which becomes flowable and conformable to three dimensional shapes when pressed while heating in a hot press apparatus. In a sheet production process, however, uneven distribution and uneven orientation of chopped strands inevitably occur, leading to deterioration in mechanical properties and a decrease in uniformity.

To provide base materials that suffer less deterioration in mechanical properties and smaller uniformity in mechanical properties, some studies have disclosed base materials (incised prepregs) produced by making incisions in prepregs containing unidirectionally oriented reinforcement fibers to cause the discontinuous fibers to orient in one direction (see, for example, Japanese Unexamined Patent Publication (Kokai) No. 2007-146151). Though formed of discontinuous fibers, incised prepregs have a high fiber volume fraction by and a high degree of reinforcement fiber orientation as a unique feature of prepregs and accordingly, they are much better in mechanical properties compared to SMCs to enable molding into complicated shapes that cannot be achieved with conventional continuous fiber prepregs. A reduction in the incision angle serves to prevent the enlargement of the incisions when the prepreg is extended, thus making it possible to produce molded articles having good mechanical properties and surface quality (see, for example, Japanese Unexamined Patent Publication (Kokai) No. 2008-207544).

The lamination base materials for prepregs described in JP '151 and JP '544, however, are low in stretchability in the thickness direction of the lamination base materials, easily leading to defective moldings attributed to them. When a two-force type die is used for molding, the clearance between the two die pieces may not be uniform and in such a case, the unevenness of clearance will lead to the coexistence of regions where the lamination base material is in contact with the die and regions where the lamination base material is not in contact with the die to cause defective moldings. When a base material is molded into a shape with a convex/concave portion, furthermore, its flow may be hindered near a rising face where pressure is not applied appropriately, depending on the thickness of the lamination base material and, as a result, the die will not be pressed sufficiently, leading to defective moldings. When molding a large member, in particular, it tends to have a complicated shape containing thickness unevenness or many convex/concave portions and in such a case, good moldings may not be produced from a single base material, failing to produce a molded article that meet necessary requirements.

Thus, it could be helpful to provide a production method for a laminated base material and a fiber reinforced plastic material suitable for molding into a complicated shape having a plurality of convex/concave portions, high in flowability and shape conformity in both the in-plane and the out-of-plane direction in a molding process, and able to provide moldings having good mechanical properties and uniform mechanical properties.

SUMMARY

We provide a production method for a laminated base material and a fiber reinforced plastic material as described below.

The laminated base material is:

a substantially flat plate-like laminated base material including at least a layer shaped body α and a layer shaped body β that are laid one on the other or side by side, the layer shaped body α having one or more plies of incised prepreg A each containing unidirectionally oriented reinforcement fibers that are impregnated with a resin composition, account for a fiber volume fraction of 45% to 65%, and are at least partly cut by a plurality of incisions to a fiber length of 10 to 300 mm, and the layer shaped body β having one or more base plies B each containing reinforcement fibers with a fiber length in the range of 10 to 300 mm impregnated with a resin composition.

We provide a fiber reinforced plastic material so high in flowability and shape conformity in both the in-plane and the out-of-plane direction in a molding process to form a complicated shape having a plurality of convex/concave portions and able to develop good mechanical properties and uniform mechanical properties after the molding process.

BRIEF DESCRIPTION OF THE DRAWINGS

FIG. 5 shows a conceptual scheme of typical reinforcement fiber bundles.

EXPLANATION OF NUMERALS

Figure 1:
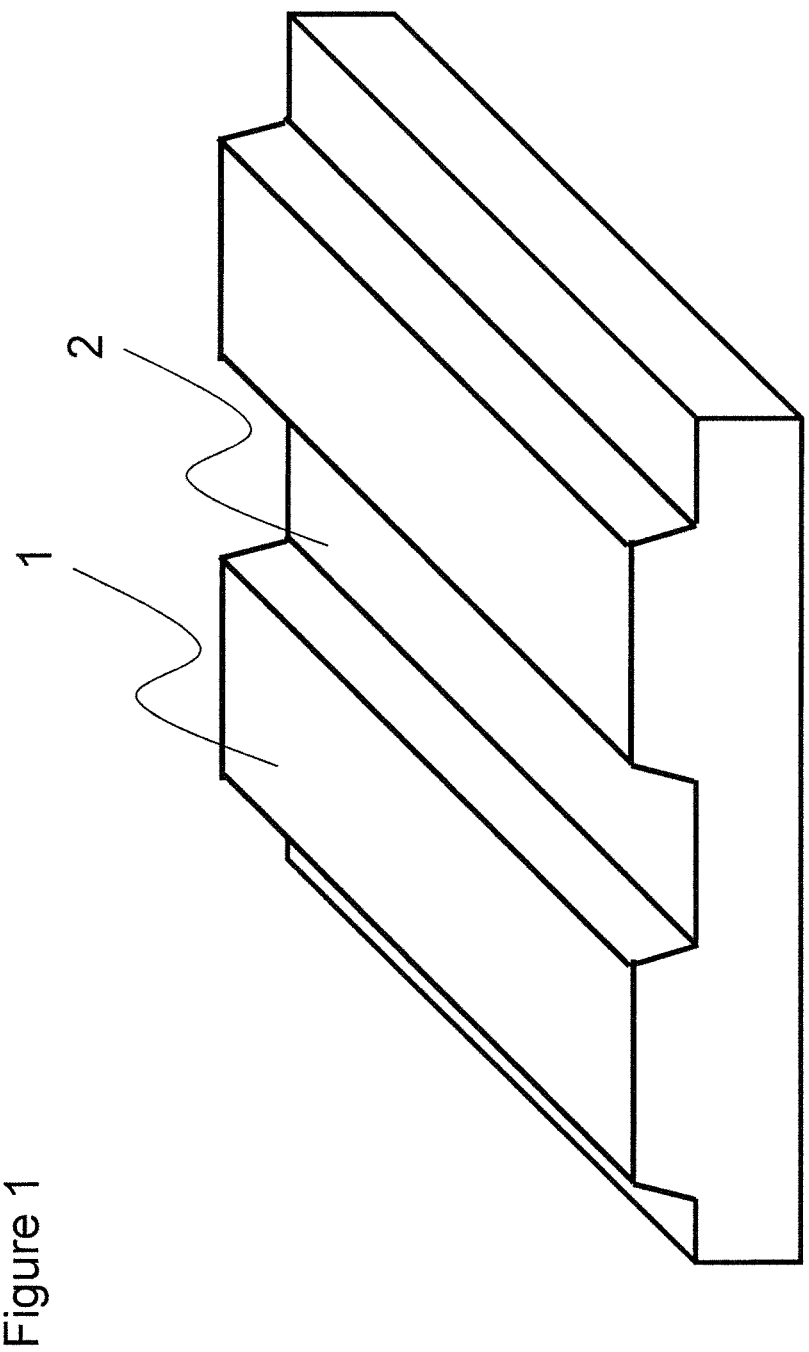
FIG. 1 shows a conceptual scheme of a typical mold.

1: convex portion of mold
2: concave portion of mold
3: layer shaped body α
4: layer shaped body β
5: fiber longitudinal direction of incised prepreg
6: perpendicular direction to fibers in incised prepreg
7: prepreg
8: incision
9: reinforcement fiber bundle
10: male half of mold used in Examples
11: female half of mold used in Examples
12: base material contact face of female half of mold used in Examples

DETAILED DESCRIPTION

We sought to obtain a fiber reinforced plastic material that has high flowability to serve for forming a complicated shape having a plurality of convex/concave portions in a molding process and high shape conformity in both the in-plane and the out-of-plane direction and develops good mechanical properties, uniform mechanical properties, and high dimensional stability after the molding process. We discovered a substantially flat plate-like laminated base material including at least a layer shaped body α and a layer shaped body β that are laid one on the other or side by side, the layer shaped body α containing one or more plies of incised prepreg A each containing unidirectionally oriented reinforcement fibers that are impregnated with a resin composition, account for a fiber volume fraction of 45% to 65%, and are at least partly cut by a plurality of incisions to a fiber length of 10 to 300 mm, and the layer shaped body β having one or more plies B each containing reinforcement fibers with a fiber length in the range of 10 to 300 mm impregnated with a resin composition.

"Convex/concave portion" means a structure containing at least one convex portion 1 and one concave portion 2 as seen, for example, in FIG. 1. There are no specific limitations on the number, locations, and size of the concave spots and convex spots in a convex/concave portion.

There are no specific limitations on the internal structure of a "layer shaped body" as long as it has a layer-like external shape, and a layer shaped body may include, for example, only one layer or a plurality of layers.

Figure 2:
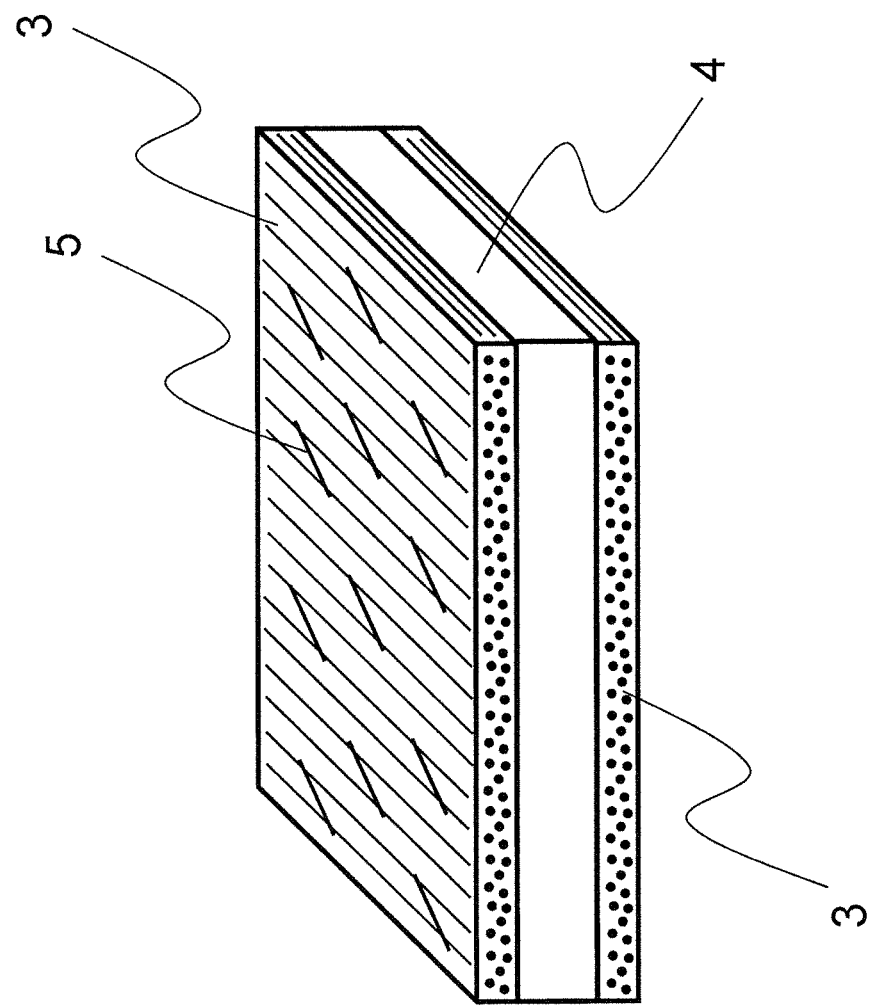
FIG. 2 shows a conceptual scheme of a typical laminated base material.
Figure 3:
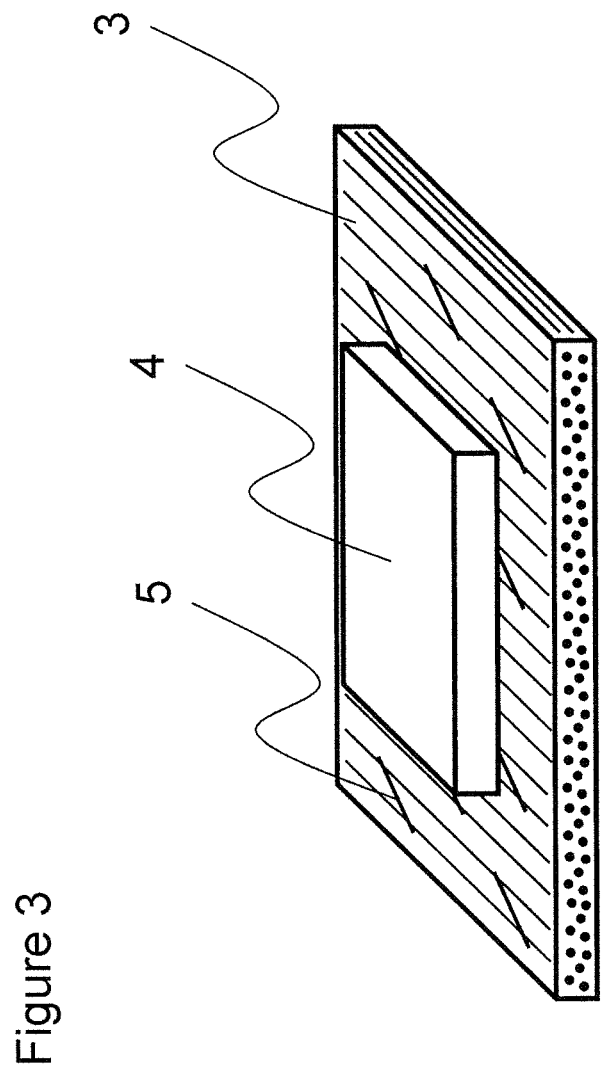
FIG. 3 shows a conceptual scheme of a typical laminated base material.
Figure 4:
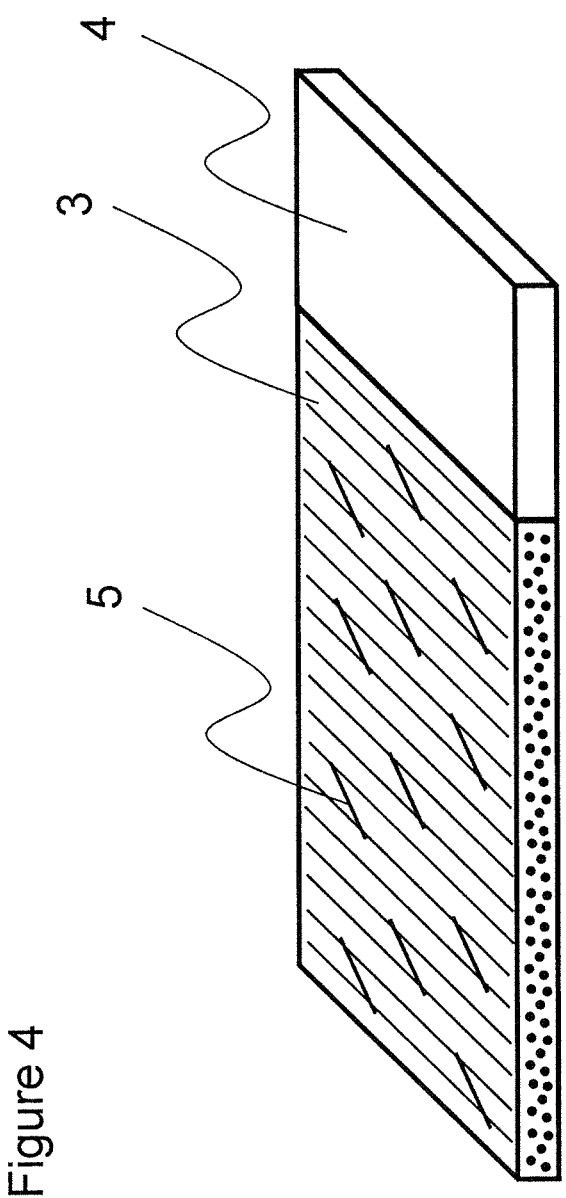
FIG. 4 shows a conceptual scheme of a typical laminated base material.

There are no specific limitations on the arrangement of the layer shaped bodies α and layer shaped bodies β laid one on the other or side by side. Accordingly, a stack structure of layer shaped bodies α and layer shaped bodies β can be designed freely. For example, a layer shaped body β may be sandwiched between two layer shaped bodies α as shown in FIG. 2, or a layer shaped body β may be laid on part of a layer shaped body α as shown in FIG. 3. Otherwise, instead of stacking, a layer shaped body α and a layer shaped body β may be laid side by side to form a substantially flat plate-like laminated base material as shown in FIG. 4. There are no specific limitations on the thickness of a laminated base material, but it is preferable for the thickness to be larger than the clearance in the mold to prevent defective moldings from resulting from a lack of resin.

"Substantially flat plate-like" means that the thickness variation in a certain region of a laminated structure is within ±20%. For example, when a layer shaped body β is laid over the entire surface of a layer shaped body α as shown in FIG. 2, the entire laminated base material should at least have a thickness variation of within ±20%, or when a layer shaped body β is laid over part of the surface of a layer shaped body α as shown in FIG. 3, the thickness variation should at least be within ±20% in both the portion where the layer shaped bodies α and the layer shaped bodies β overlap each other and the portion where they do not overlap each other.

A layer shaped body α contains one or more plies of incised prepreg A each containing unidirectionally oriented reinforcement fibers that are impregnated with a resin composition, account for a fiber volume fraction of 45% to 65%, and are at least partly cut by a plurality of incisions to fiber lengths of 10 to 300 mm, The incised prepreg A contains unidirectionally oriented reinforcement fibers and, therefore, a fiber reinforced plastic material with desired mechanical properties can be obtained by controlling the orientation of the fiber direction in the layer shaped body.

There are no specific limitations on the incised prepreg A to be used in a layer shaped body α, and they may be of such materials as glass fiber, Kevler fiber, carbon fiber, graphite fiber, and boron fiber.

There are no specific limitations on the type of resin composition to be used in the incised prepreg A in a layer shaped body α, and it may be of a thermoplastic resin or a thermosetting resin. Examples of the thermoplastic resin include, for example, polyamide, polyacetal, polyacrylate, polysulfone, ABS, polyester, acrylic, polybutylene terephthalate (PBT), polycarbonate (PC), polyethylene terephthalate (PET), polyethylene, polypropylene, polyphenylene sulfide (PPS), polyether ether ketone (PEEK), polyetherimide (PEI), polyether ketone (PEK), liquid crystal polymers, polyvinyl chloride, polytetrafluoroethylene, other fluorine based resins, and silicone.

There are no specific limitations on the type of thermosetting resin as long as the resin used can undergo a crosslinking reaction when heated to form an at least partly three dimensional crosslinked structure. Examples of such thermosetting resin include, for example, saturated polyester resin, vinyl ester resin, epoxy resin, benzoxazine resin, phenol resin, urea resin, melanin resin, and polyimide resin. Modified forms of these resins and blends of two or more thereof may also be used. Furthermore, these thermosetting resins may be self-curable by heating or may be blended with a curing agent, a curing accelerator, or the like. Furthermore, they may contain certain additives. There are no specific limitations on such additives. For example, thermoplastic resin particles may be added to improve the toughness, or an inorganic filler may be added to improve the electric conductivity. There are no specific limitations on the shape of such additives, and they may be, for example, spherical, non-spherical, needle-like, or whisker-like. It may be appropriate to adopt a resin composition that can be improved in toughness, electric conductivity, fast cure type, heat resistance or the like, by adding a specific additive to the matrix resin.

The incised prepreg A in a layer shaped body α contain unidirectionally oriented reinforcement fibers having a plurality of incisions and at least part of the reinforcement fibers are cut to fiber lengths of 10 to 300 mm. Cutting the reinforcement fibers allows the fibers to flow, particular in the fiber longitudinal direction as well, in the molding process, leading to a base material that is high in conformity to a complicated shape. If the reinforcement fibers have no incisions and are in the state of continuous fibers, they will not flow in the fibers' longitudinal direction and will be difficult to mold into a complicated shape. Compared to this, if at least part of the fibers are cut to a fiber length of 10 mm or more, the incisions in the prepreg will be sufficiently away from each other, leading to a molded fiber reinforced plastic material in which the cracks formed by incisions at fiber edges will not connect easily to each other to ensure improved strength. Accordingly, from the viewpoint of shape conformity during the molding process and mechanical properties of molded fiber reinforced plastic materials, at least part of the fibers should have a fiber length of 10 to 300 mm. The length should more preferably be 10 to 50 mm.

There are no specific limitations on the arrangement of the incisions in the incised prepreg A in a layer shaped body α, it is preferable for them to be spaced appropriately away from each other. If the incisions in the prepreg are located continuously, the incisions will be largely opened in the flow, leading to a molded fiber reinforced plastic material suffering from deteriorated surface quality. Furthermore, there are no specific limitations on the absolute value of the incision angle to the longitudinal direction of the reinforcement fibers, but it is preferably 2° to 45°. If the absolute value of the incision angle is 45° or less, the in-plane stretchability will be high and the incisions will not open largely. If the absolute value of the incision angle is smaller than 2°, on the other hand, it will be difficult to make incisions stably. Mechanical properties will improve considerably if the absolute value of the incision angle is 25° or less, and accordingly, it is more preferably 2° to 25°, particularly preferably 5° to 15°.

For the incised prepreg A in a layer shaped body α, the fiber volume fraction is 65% or less to ensure a required flowability of reinforcement fibers and a required quantity of resin existing around incisions in molded products. Flowability increases with a decreasing fiber volume fraction, but if it is less than 45%, mechanical properties required for structural members will not be obtained and, in the case of prepreg in particular, fibers will meander. From such a point of view, the incised prepreg A in a layer shaped body α should have a fiber volume fraction of 45% to 65%.

A layer shaped body α contains one or more such plies of incised prepreg A as described above. There are no specific limitations on the stack structure of these plies of incised prepreg A, but it is preferable that two or more be contained and that they be stacked such that the reinforcement fibers in these layers are oriented in different directions. If the layers are stacked in this manner, the reinforcement fibers in each incised prepreg will flow in the fiber longitudinal direction as well. Examples of such stack structures include pseudo-isotropic stacking and orthogonal stacking. Pseudo-isotropic stacking is suitable to produce a molded fiber reinforced plastic material having isotropic mechanical properties, whereas orthogonal stacking is suitable when base plies with high stretchability are desired in the molding process.

A layer shaped body β has one or more base plies B each containing reinforcement fibers with fiber lengths in the range of 10 to 300 mm impregnated with a resin composition. In a substantially flat plate-like laminated base material, a layer shaped body β is in contact with a layer shaped body α to increase the flowability if the layer shaped body α alone fails to ensure a required flowability. As in the layer shaped body α, the fiber length in the base plies B in a layer shaped body β should be 10 to 300 mm from the viewpoint of shape conformity during the molding process and mechanical properties of molded fiber reinforced plastic materials. The length should more preferably be 10 to 50 mm.

The reinforcement fibers used for the base plies B in a layer shaped body β may be similar reinforcement fibers to the reinforcement fibers described above in relation to impregnation of the incised prepreg A, or may be different from the reinforcement fibers adopted as the reinforcement fibers for the incised prepreg A.

The resin composition used for the base plies B in a layer shaped body β may be a similar resin composition to the resin composition described above in relation to the incised prepreg A, or may be different from the resin composition adopted as the resin composition for the incised prepreg A.

When combining a layer shaped body α and a layer shaped body β, there are no specific limitations on the thickness of each layer shaped body, and an appropriate thickness may be adopted to meet the required mechanical properties and thickness variation. When high-level mechanical properties are required, the thickness of the layer shaped body α is preferably not less than the thickness of the layer shaped body β, and more preferably larger by 20% or more than that of the layer shaped body β. If the intended base material requires a large thickness variation though not requiring high-level mechanical properties, on the other hand, the thickness of the layer shaped body α is preferably not more than the thickness of the layer shaped body β. It is more preferably smaller by 20% or more than the thickness of the layer shaped body β.

There are no specific limitations on the stacking method to produce a laminated base material, but it is preferable that a layer shaped body β is sandwiched between a plurality of layer shaped bodies α. If a layer shaped body α with a lower stretchability than that of a layer shaped body β exists at the surface of the laminated base material, the disorder in fiber orientation caused by a large extension will not appear in the outer layer. If each layer shaped body α contains prepreg plies, furthermore, the existence of layer shaped bodies α on both sides of a layer shaped body β serves to maintain a high orientation in the layer shaped body β. This ensures good surface quality as well as improved mechanical properties including bending stiffness. When producing a molded product having a plurality of complicated shape portions, some of the complicated shape portions may be formed of a layer shaped body β alone by allowing the highly flowable layer shaped body β to flow largely. In this case, if in the region containing layer shaped bodies α, the layer shaped body β is sandwiched between the layer shaped bodies α, the region containing only the layer shaped body β that forms a complicated shape portion and the region containing both the layer shaped bodies α and the layer shaped body β will be integrated firmly. If simply a layer shaped body α and a layer shaped body β extending in parallel are molded, destruction will occur easy at the boundary between the layers. Compared to this, if the layer shaped body β is interposed between layer shaped bodies α, the region containing only the layer shaped body β, which is surrounded by a region containing layer shaped bodies α, can be joined smoothly with the interposed layer shaped body β. Furthermore, the interposition between layer shaped body α allows the layer shaped body β to have a higher degree of orientation in the in-plane direction, leading to largely increased boundary strength.

In a more preferred structure of the laminated base material, the base material B contains a plurality of reinforcement fiber bundles paralleled in one direction. "A reinforcement fiber bundle" means a group of discontinuous reinforcement fibers oriented in one direction. If part of the reinforcement fibers in each base material B are paralleled to form bundles, the fiber volume fraction can be improved while maintaining a high flowability of the discontinuous fibers. Compared to base plies having the same fiber volume fraction, but having completely random orientation, a higher flowability can be maintained because of a lower degree of entanglement of reinforcement fibers. Accordingly, this will allow the laminated base material to maintain a high flowability during the molding process, while simultaneously allowing the laminated base material to be molded into a fiber reinforced plastic material with good mechanical properties. There are no specific limitations on the arrangement of the reinforcement fiber bundles, and they may be arranged randomly or may have a directional feature. An example of such base material is SMC, which contains randomly oriented reinforcement fiber bundles and serves as base material. Compared to this, in an incised prepreg, which is produced by making incisions in a continuous fiber prepreg that contains unidirectionally oriented reinforcement fibers, quadrangle regions each defined by two incisions adjacent in the fiber longitudinal direction and two line segments connecting the ends of the incisions as shown in FIG. 5 act as bundles of reinforcement fibers, thus allowing the prepreg to serve as a base material with unidirectionally oriented reinforcement fiber bundles spreading over the entire surface.

For a laminated base material, it is more preferable if the reinforcement fiber bundles in each base material B are oriented in five or more directions. The orientation direction of reinforcement fiber bundles is defined by the fiber longitudinal direction of the unidirectionally paralleled reinforcement fibers in the reinforcement fiber bundles. The number of orientation directions of the reinforcement fiber bundles in this base material B is determined by solidifying, if required, the base material B and observing the reinforcement fiber bundles in the surface by microscopy. A base material B containing such reinforcement fiber bundles oriented in five or more directions will tend to flow isotropically to ensure high shape conformity to a variety of complicated shapes. Compared to the manufacturing of sheets in which reinforcement fiber bundles are completely oriented unidirectionally, the production equipment can be simplified to ensure low production costs. It is more preferable for the fibers in the base material B to be oriented in eight or more directions because more isotropic flows are ensured. It is still more preferable for the reinforcement fiber bundles to be arranged randomly and uniformly. An example of a base having such a structure is SMC. It is more preferable for the reinforcement fiber bundles to have edges aligned obliquely to the fiber longitudinal direction. If they are aligned obliquely, the reinforcement fiber edges will be deformed easily during the press molding process, leading to a molded fiber reinforced plastic material that contains fewer resin-rich portions.

It is more preferable for the laminated base material to have base plies B containing reinforcement fibers with a fiber length in the range of 25 to 50 mm and having a fiber volume fraction of 30% to 45%. According to a particularly preferred example, the base plies B contain reinforcement fiber bundles oriented in five or more directions and the reinforcement fibers contained in the base plies B have a fiber length of 25 to 50 mm and a fiber volume fraction of 30% to 45%. Where the reinforcement fiber bundles are oriented in five or more directions, reinforcement fiber bundles will interfere with each other while flowing if the reinforcement fibers have a fiber length of more than 50 mm, thus failing to achieve required flow properties. If the fiber length of the reinforcement fiber is less than 25 mm, on the other hand, required mechanical properties will not be achieved because the reinforcement fibers are oriented in too many directions. From the viewpoint of ensuring required mechanical properties, it is preferable for the fiber volume fraction to be 30% or more. On the other hand, the reinforcement fiber bundles in the base plies B are oriented in many directions and accordingly, the fiber bundles will interfere strongly with each other and fail to achieve a required flowability if the fiber volume fraction is more than 45%. From the viewpoint of the relation between flow properties and mechanical properties, therefore, the fiber length of the reinforcement fibers in the base plies B is preferably 25 to 50 mm and simultaneously the fiber volume fraction is 30% to 45%.

According to another preferred example of the laminated base material, the base material B is an incised prepreg B that is produced by preparing a prepreg containing unidirectionally oriented reinforcement fibers impregnated with a resin composition and cutting all the reinforcement fibers by making a plurality of incisions, wherein the incised prepreg B has a fiber volume fraction that is smaller than the fiber volume fraction of the incised prepreg A. Since the base material B is in the form of an incised prepreg, the reinforcement fibers in the base material B are substantially completely unidirectionally oriented, making it possible to control the fiber orientation. Therefore, by controlling the fiber orientation separately in different layers including the incised prepreg A, it will be possible to design a molded fiber reinforced plastic material having desired mechanical properties. To produce a layer shaped body B having a high flowability, it is preferable for the fiber volume fraction of the incised prepreg B to be smaller than that of the incised prepreg A. In particular, the fiber volume fraction of the incised prepreg B is preferably smaller by 10% or more than that of the incised prepreg A.

There are no specific limitations on the form of the incisions in the incised prepreg B, but the incisions are preferably spaced appropriately away from each other and in addition the incision angle is preferably 2° to 45° to the longitudinal direction of the reinforcement fibers, for the same reasons as for the incised prepreg A. Depending on the purpose, furthermore, the incision pattern of the incised prepreg B and the incision pattern of the incised prepreg A may be identical to or different from each other, and an appropriate pattern may be adopted to meet required features. If the same incision pattern is adopted, the incision pattern of the incised prepreg B will be prevented from being transferred to the surface of a molded fiber reinforced plastic material, thus ensuring a uniform surface quality. By adopting different incision patterns, on the other hand, the flowability of the incised prepreg B can be controlled to ensure improved moldability.

A layer shaped body β has one or more base plies B, and there are no specific limitations on the stack structure. However, it is preferable for a layer shaped body β to contain two or more base plies B stacked one on the other, and the layers are preferably stacked such that they differ from each other in the orientation angle of the reinforcement fibers. If each of the base plies B stacked in this way is in the form of an incised prepreg B, the reinforcement fibers in each ply of incised prepreg B will be able to flow in the fiber longitudinal direction as well. Examples of such a stack structure include pseudo-isotropic stacking and orthogonal stacking. Pseudo-isotropic stacking is suitable for producing a molded fiber reinforced plastic material having isotropic mechanical properties, whereas orthogonal stacking is suitable when base plies with high stretchability are more desired in the molding process.

It is more preferable for the laminated base material to have base plies B containing reinforcement fibers with a fiber length of 10 to 300 mm and having a fiber volume fraction of 45% to 55%. According to a particularly preferred example, the base material B is in the form of an incised prepreg B, the fiber volume fraction of the incised prepreg B being smaller than the fiber volume fraction of the incised prepreg A, the reinforcement fibers in the base material B having a fiber length of 10 to 300 mm, and the fiber volume fraction of the base material B being 45% to 55%. As in the incised prepreg A, it is preferable for the reinforcement fibers in the base material B to have a fiber length in the range of 10 to 300 mm from the viewpoint of the relation between flowability and mechanical properties. It is more preferably 10 to 50 mm. The fiber volume fraction of the base material B is preferably 45% or more to allow the fiber reinforced plastic material to have required mechanical properties to serve as a structural member. The fiber volume fraction is larger as compared to the other preferred example wherein the reinforcement fiber bundles in the base material B are oriented in five or more directions, but if the base material B is in the form of an incised prepreg B, resin can be concentrated between the layers. Compared to when the reinforcement fiber bundles are dispersed in many directions, a required flowability can be obtained even when the fiber volume fraction is increased. If it is more than 55%, on the other hand, the difference in flowability between the layer shaped body α and layer shaped body β will decrease, impairing the effect of adding the layer shaped body β. Accordingly, it is preferable for the reinforcement fibers in the base material B to have a fiber volume fraction in the range of 45% to 55%. However, since the mechanical properties of the base material B depend on both the fiber length and the fiber volume fraction, the lower limit of the fiber volume fraction depends on the fiber length. The fiber volume fraction of reinforcement fibers is preferably 45% or more when the fiber length is 10 mm, but 40% or more is sufficient when, for example, the fiber length is 15 mm.

According to a still more preferred example of the laminated base material, the number of fibers in each reinforcement fiber bundle in the base material B is larger than the number of fibers in each reinforcement fiber bundle in the incised prepreg A. As described previously, a reinforcement fiber bundle in an incised prepreg means a quadrangle region defined by two incisions adjacent in the fiber longitudinal direction and two line segments connecting the ends of the incisions. The "number of fibers" is determined by measuring the average number of fibers in randomly sampled 20 reinforcement fiber bundles and rounding off the number of fibers to the nearest hundredth. The number of fibers is measured by solidifying, if required, reinforcement fiber bundles impregnated with resin and observing a cross section in the substantially central part of a reinforcement fiber bundle by microscopy. As the number of fibers in a reinforcement fiber bundle increases, the decrease in flowability of the base material caused by entanglement of flowing fibers can be depressed. When producing reinforcement fiber bundles, furthermore, the quantity and the number of times of cutting reinforcement fibers can be decreased and accordingly the production cost can be reduced with an increasing number of fibers contained in a reinforcement fiber bundle.

We also found the following production method for fiber reinforced plastic materials as another example. Specifically, it is a production method for a fiber reinforced plastic material having a stack structure containing convex/concave portions, including a step for press-molding the aforementioned laminated base material at a temperature of T and a pressure of P to produce a fiber reinforced plastic material, wherein a layer shaped body α and a layer shaped body β are press-molded in a flat plate-like double-side mold at a temperature of T and a pressure of P to provide a fiber reinforced plastic material characterized in that the stretching ratio, which is calculated by dividing the area after molding by the area before molding, of the layer shaped body β is larger than that of the layer shaped body α.

"Flat plate-like" means that the thickness variation is within ±10% over the entire region of an object. The stretching ratio of a molding that is press-molded in a flat plate-like double-side mold at a temperature of T and a pressure of P is calculated by dividing the area after molding by the area before molding. If a high-flowability layer shaped body β is laid on a layer shaped body α and then press-molded, the layer shaped body β will flow largely in the molding process and the laminated base material will deform largely in the thickness direction. This deformation in the thickness direction will act to adapt to changes in the clearance in the mold. For laminated base materials having the same structural feature, the stretching ratio will improve with an increasing thickness. Accordingly, the preferred stretching ratio varies depending on the thickness of the laminated base material. When the ratio of the thickness of the layer shaped body α divided by the thickness of the layer shaped body β is 0.8 to 1.2, the stretching ratio of the layer shaped body β is preferably larger by 10% or more than that of the layer shaped body α. It is preferably larger by 20% or more when the ratio is smaller than 0.8, and preferably larger by 5% or more when the ratio is larger than 1.2.

A fiber reinforced plastic material can be produced in a more preferred manner if the surface area of the layer shaped body α in the convex/concave portion-containing face of the fiber reinforced plastic material accounts for 110% to 150% relative to the surface area, which accounts for 100%, of the layer shaped body α in the pressed face of the laminated base material. If the layer shaped body α, which works to maintain rigidity, also has stretchability, it will serve suitably for molding into a complicated shape. Deformation of the laminated base material in the thickness direction requires flowing of the base plies in the in-plane direction and accordingly, effective deformation in the thickness direction can be achieved if not only the layer shaped body β but also the layer shaped body α stretches in the in-plane direction. The surface area of the convex/concave portion-containing face of the fiber reinforced plastic material preferably accounts for 110% or more relative to the surface area, which accounts for 100%, of the pressed face of the laminated base material. If the proportion is more than 150%, the layer shaped body α will stretch largely in the in-plane direction and accordingly, the entire laminated base material will become thinner, possibly leading to deterioration in mechanical properties. Thus, the surface area of the convex/concave portion-containing face of the fiber reinforced plastic material preferably accounts for 150% or less relative to the surface area, which accounts for 100%, of the pressed face of the laminated base material. Furthermore, the proportion is still more preferably 130% or less from the viewpoint of surface quality and mechanical properties. The proportion of the surface area of the layer shaped body α in the convex/concave portion-containing face of the fiber reinforced plastic material relative to the surface area, which accounts for 100%, of the layer shaped body α in the pressed face of the laminated base material is calculated by equation (1) below:

((total area of layer shaped body α in plane view in fiber reinforced plastic material)+(total area of layer shaped body α in rising face in fiber reinforced plastic material))/(total area of layer shaped body α in laminated base material)×100   (I)

EXAMPLES

Our materials and methods will now be illustrated in more detail with reference to examples, but it should be understood that this disclosure is not construed as being limited to the aspects of the disclosure described in these examples.

The preparation of layer shaped bodies α and layer shaped bodies β, molding of laminated base materials, and measurement of the stretchability of layer shaped bodies in Examples were carried out by the methods described blow.

Preparation of Resin Films

An epoxy resin mixture (35 parts by weight of jER (registered trademark) 828 manufactured by Japan Epoxy Resins Co., Ltd., 30 parts by weight of jER (registered trademark) 1001, and 35 parts by weight of jER (registered trademark) 154) was heat-kneaded with 5 parts by weight of thermoplastic polyvinyl formal (Vinylec (registered trademark) K, manufactured by Chisso Corporation), a thermoplastic resin, in a kneader to ensure uniform dissolution of the polyvinyl formal, followed by kneading with 3.5 parts by weight of dicyandiamide (DICY7, manufactured by Japan Epoxy Resins Co., Ltd.) and 4 parts by weight of 3-(3,4-dichlorophenyl)-1,1-dimethylurea (DCMU99, manufactured by Hodogaya Chemical Co., Ltd.), as curing agent and curing accelerator, respectively, in a kneader to prepare an uncured epoxy resin composition. Using a reverse roll coater, this epoxy resin composition was spread over silicone-coated release paper to prepare resin film samples with a weight of 37, 44, 29, or 50 g/m².

Preparation of Continuous Fiber Prepreg

Before producing plies of incised prepreg and SMCs, continuous fiber prepreg A to D to serve as their components were prepared by the method described below.

To produce the continuous fiber prepreg A, two pieces of the resin film with a weight of 37 g/m² prepared by the procedure described above were attached to both sides of a unidirectionally oriented carbon fiber sheet (T700S) with a weight of 150 g/m² and pressed while heating to provide a continuous fiber prepreg with a fiber volume fraction of 58%.

To produce the continuous fiber prepreg B, two pieces of the resin film with a weight of 44 g/m² prepared by the procedure described above were attached to both sides of a unidirectionally oriented carbon fiber sheet (T700S) with a weight of 150 g/m² and pressed while heating to provide a continuous fiber prepreg with a fiber volume fraction of 53%.

To produce the continuous fiber prepreg C, two pieces of the resin film with a weight of 29 g/m² prepared by the procedure described above were attached to both sides of a unidirectionally oriented carbon fiber sheet (T700S) with a weight of 150 g/m² and pressed while heating to provide a continuous fiber prepreg with a fiber volume fraction of 63%.

To produce the continuous fiber prepreg D, two pieces of the resin film with a weight of 50 g/m² prepared by the procedure described above were attached to both sides of a unidirectionally oriented carbon fiber sheet (T700S) with a weight of 150 g/m² and pressed while heating to provide a continuous fiber prepreg with a fiber volume fraction of 50%.

Preparation of Incised Prepreg

Figure 6:
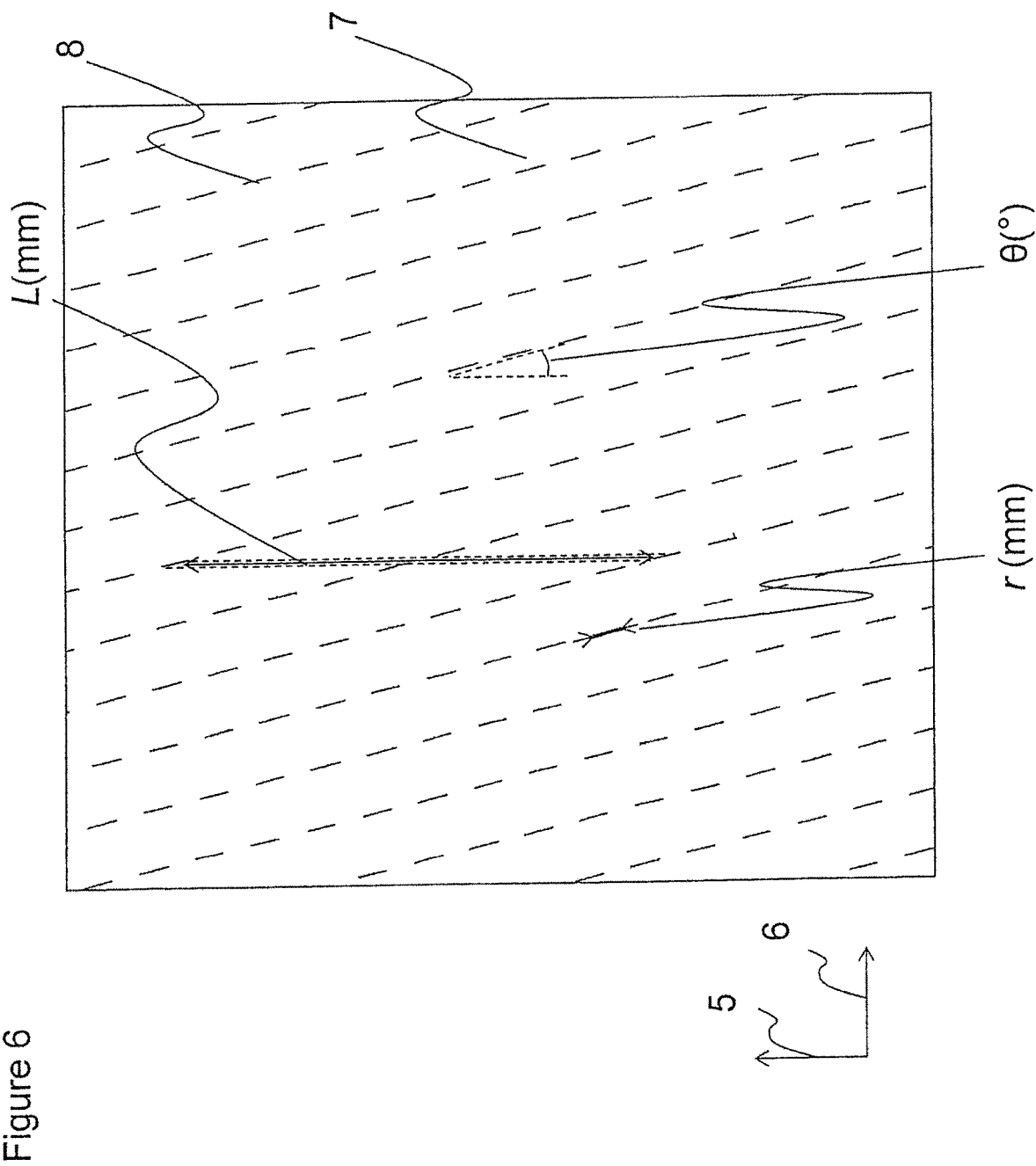
FIG. 6 shows a pattern of incisions made in a prepreg in Examples.

To produce an incised prepreg to serve as a component of a layer shaped body α or layer shaped body β, incisions were made in a continuous fiber prepreg prepared by the procedure described above. Using a rotor cutter, incisions were made over the entire ply of the prepreg. Incised prepregs A to H were prepared by making incisions according to the pattern shown in FIG. 6 and according to Table 1 which lists the values of the parameters defined in FIG. 6. The incised prepregs A, C, G, and H, incised prepregs B and D, incised prepreg E, and incised prepreg F were prepared by making incisions in the continuous fiber prepreg A, continuous fiber prepreg B, continuous fiber prepreg C, and continuous fiber prepreg D, respectively.

TABLE 1

|  | Incision angle θ [°] | Incision length r [mm] | Fiber length L [mm] | Fiber volume fraction [%] | Number of fibers in reinforcement fiber bundle |
|---|---|---|---|---|---|
| Incised prepreg A | 14 | 1.3 | 24 | 58 | 700 |
| Incised prepreg B | 14 | 1.4 | 24 | 53 | 700 |
| Incised prepreg C | 14 | 5.2 | 24 | 58 | 2,900 |
| Incised prepreg D | 14 | 5.6 | 24 | 53 | 2,900 |
| Incised prepreg E | 14 | 1.3 | 15 | 63 | 800 |
| Incised prepreg F | 14 | 1.3 | 45 | 50 | 600 |
| Incised prepreg G | 24 | 1.3 | 24 | 58 | 1,200 |
| Incised prepreg H | 14 | 2.6 | 24 | 58 | 1,400 |

Preparation of SMC

SMC (A) was prepared by chopping the continuous fiber prepreg A produced by the procedure described above to provide prepreg chips with a width of 0.3 mm and a length of 30 mm, which were then laid to be oriented in five or more directions, sandwiched between the aforementioned resin films to adjust the fiber volume fraction to 30%, and pressure-bonded in a vacuum at 70° C. for 1 minute.

SMC (B) was prepared by chopping the continuous fiber prepreg B produced by the procedure described above to provide prepreg chips with a width of 1.3 mm and a length of 30 mm, which were then laid to be oriented in five or more directions, sandwiched between the aforementioned resin films to adjust the fiber volume fraction to 30%, and pressure-bonded in a vacuum at 70° C. for 1 minute.

Preparation of Nonwoven Fabric Prepreg

Nonwoven fabric prepregs were prepared by the following production method. Polyoxy ethylene alkyl ether (LEOX (registered trademark) CC-50, manufactured by Lion Corporation) was adjusted to a concentration of 10 wt % to prepare a sizing agent. Unidirectionally oriented continuous bundles of carbon fibers (T700S) were immersed in an aqueous solution of this sizing agent adjusted to a concentration of 2.0 wt % to attach the sizing agent and dried at 200° C. for 2 minutes using a hot air drier, and the carbon fibers were cut to a length of 10 mm using a cartridge cutter to provide chopped carbon fiber strands. Elsewhere, 2,000 cc of water was poured in a tube container and a surface active agent (polyoxyethylene lauryl ether, manufactured by Nacalai Tesque, Inc.) was added to a concentration of 0.1 wt %. This aqueous solution of the surface active agent was stirred at 1,400 rpm in a stirring machine until minute air bubbles appeared. The chopped carbon fiber strands prepared by the procedure described above were added to the above aqueous surface active agent solution containing dispersed minute air bubbles until the weight of carbon fibers came to 30 g/m², followed by stirring until the content of unopened fiber bundles came to less than 10 wt %. The resulting dispersion liquid was subjected to dehydration through a porous support to provide a uniform web. The resulting web was dried at 140° C. for 1 hour by a hot air drier to provide a nonwoven fabric base material containing carbon fibers. Subsequently, a 5 wt % emulsion liquid of maleic anhydride-modified polypropylene (MGP-055, manufactured by Maruyoshi Chemical Co., Ltd.) was dropped from a dropper uniformly over the nonwoven fabric base material at a dropping rate of 65 g/m². Then, thorough drying was performed by a hot air drier (140° C., 1 hour). In this way, a binder component was given to a nonwoven fabric base material. The above nonwoven fabric base material was sandwiched between two of the aforementioned resin films with the fiber volume fraction adjusted to 30% and they were vacuum pressure-bonded at 70° C. for 1 minute to provide a nonwoven fabric prepreg base material.

Such base plies were cut to a predetermined size and stacked to form a predetermined stack structure to provide a layer shaped body β.

A laminated base material prepared by the above procedure was put at the center of a mold that had been heated at 130° C. in a pressing machine and pressed between the top force and the bottom force for 30 minutes at a molding temperature of 130° C. and a molding pressure of 2.0 MPa. Then, the molding was taken out of the mold to provide a fiber reinforced plastic material of the intended structure.

Molded fiber reinforced plastic material samples were evaluated in terms of surface quality (fiber turbulence and the like), defects (resin-poor portions, resin-rich portions and the like), and mechanical properties (bending strength, bending stiffness), and rated according to a four-stage criterion (represent as ⊚, ○, Δ, and ×). The criterion was as shown in Table 2. Evaluation for bending stiffness was performed according to ASTM D790. Each test piece was prepared by cutting out a 12.7×50.0 mm portion from a planar part of a concave portion Q or S such that the longitudinal direction of the concave portion was parallel to the longitudinal direction of the test piece.

TABLE 2

|  | ⊚ | ○ | Δ | X |
|---|---|---|---|---|
| Surface quality | fiber turbulence not found | fiber turbulence found on only one side | fiber turbulence found on both sides | many fiber turbulence on both sides |
| Defects | resin-poor, resin-rich portions not found | small resin-poor, resin-rich portions found | resin-poor, resin-rich portions found | many resin-poor, resin-rich portions |
| Mechanical properties | bending strength 500 MPa or more and bending stiffness 42 GPa or more | bending strength 500 MPa or more and bending stiffness 32 GPa or more, less than 42 GPa | bending strength 500 MPa or more and bending stiffness less than 32 GPa | bending strength less than 500 MPa |

Molding of Laminated Base Material

Figure 7:
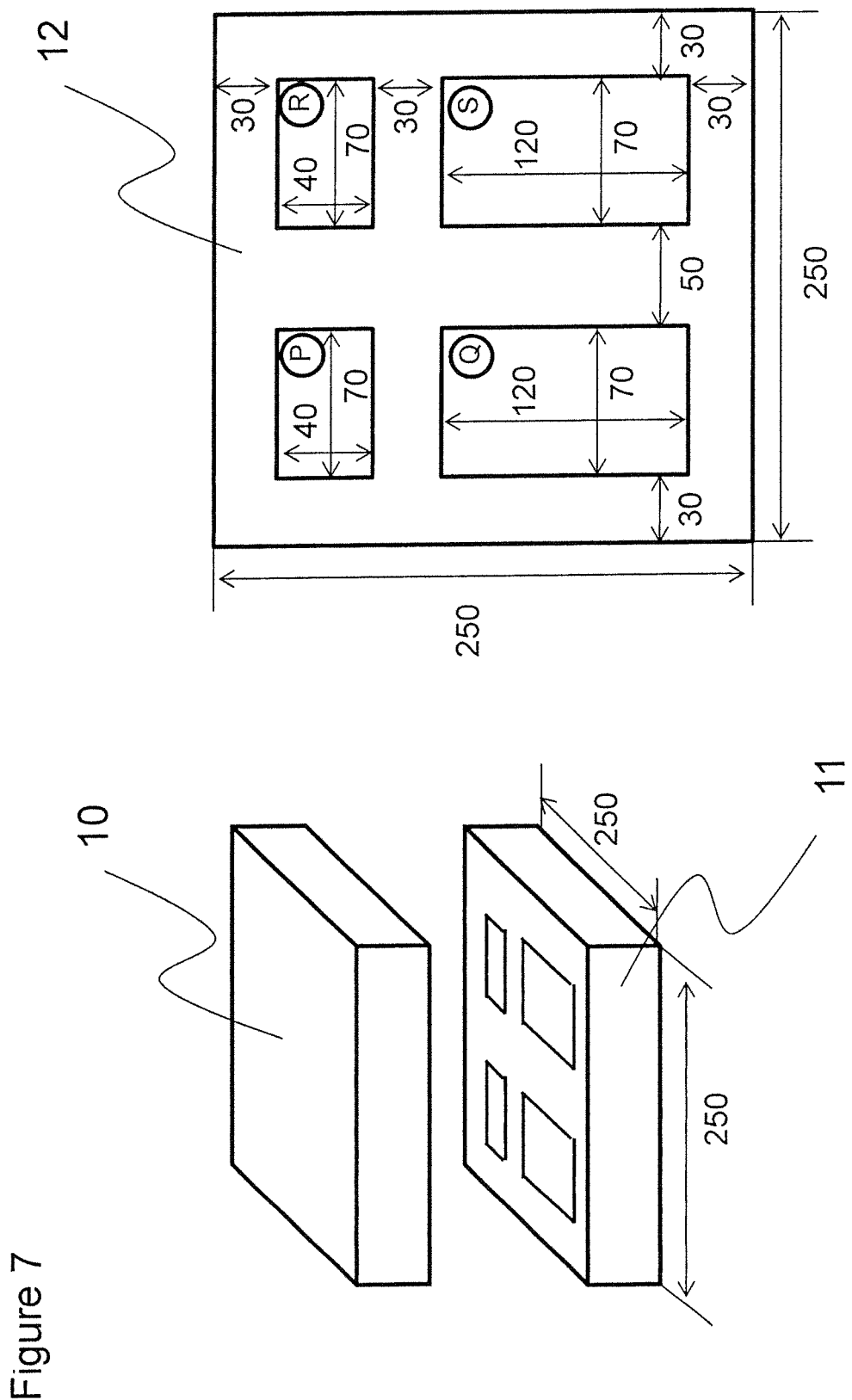
FIG. 7 shows a shape of a mold used in Examples.
Figure 8:
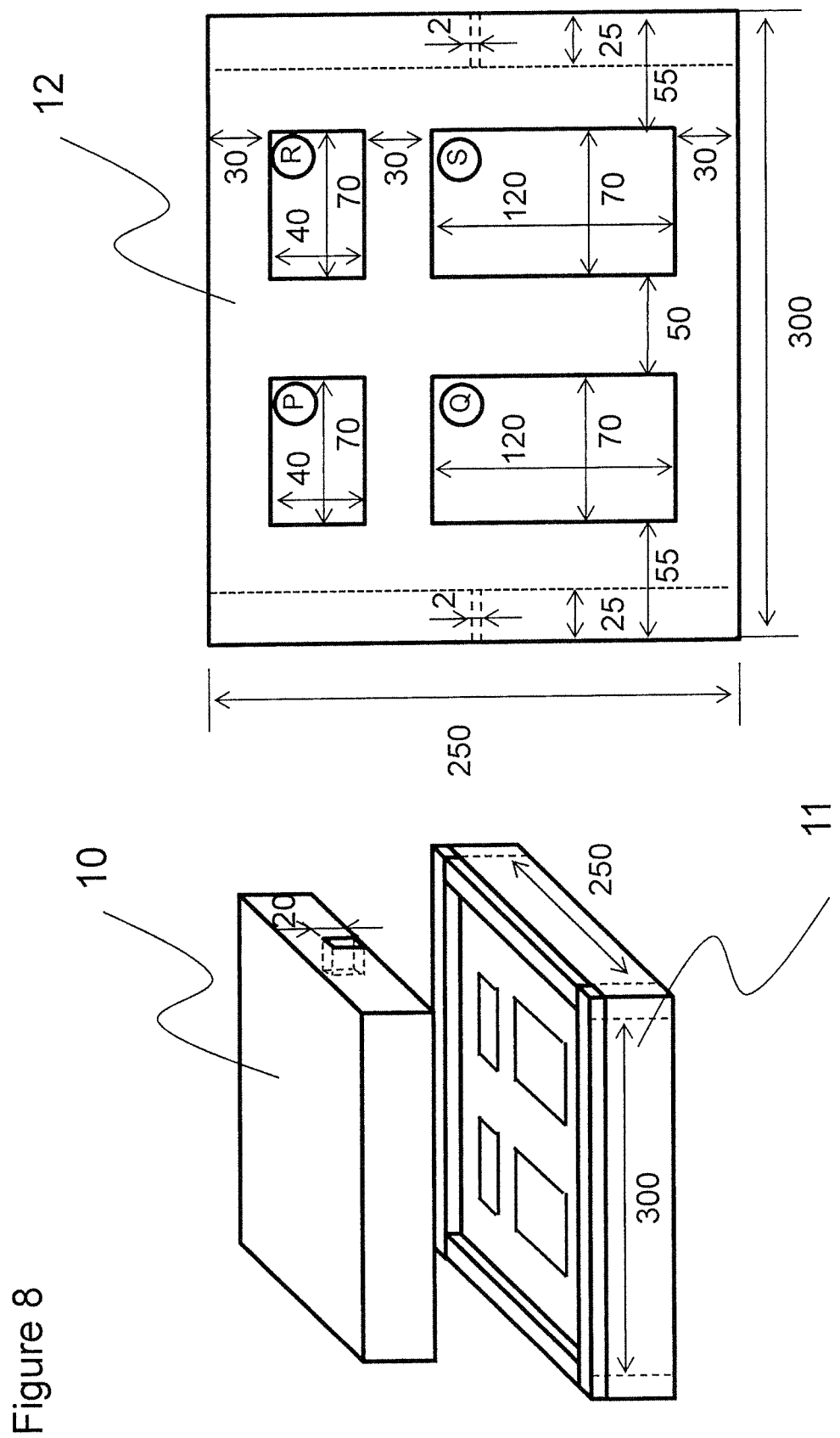
FIG. 8 shows a shape of a mold used in Examples.

For Examples given below, molds as shown in FIGS. 7 and 8 were used to perform molding. In both molds, the clearance between two mold halves was 2.5 mm. The mold in FIG. 7 has four convex/concave portions, whereas the mold in FIG. 8 is basically the same as the one in FIG. 7, but additionally has two ribs each having a width of 25 mm, a height 20 mm, and a thickness of 2 mm. In the pressed face of the laminated base material, the proportion of the surface area of the layer shaped body α in the convex/concave portion-containing face of a fiber reinforced plastic material relative to the surface area, which accounts for 100%, of the layer shaped body α was calculated by equation (I) below:

((total area of layer shaped body α in plane view in fiber reinforced plastic material)+(total area of layer shaped body α in rising face in fiber reinforced plastic material))/(total area of layer shaped body α in laminated base material)×100  (I)

The concave portions in the molds shown in FIGS. 7 and 8 have different depths depending on the position, and specifically, the concave portions P and the concave portions Q have a depth of 10 mm whereas the concave portions R and the concave portions S have a depth of 12 mm in FIGS. 7 and 8. If these molds are used for press molding, formation of the concave portions will cause stretching of about 21%.

To produce a laminated base material, layer shaped bodies α and layer shaped bodies β were cut out to a size of 250 mm×250 mm and stacked to form a predetermined stack structure. After stacking, vacuum pressure-bonding was performed for 30 minutes to strengthen the contact between the base plies. Then, the thickness of the laminated base material was measured with a micrometer at nine appropriately selected positions to examine the thickness variation over the laminated base material.

Measurement of Stretchability of Layer Shaped Bodies

From a layer shaped body α or a layer shaped body β, a 100 mm×100 mm piece was cut out, put between flat mold halves that had been heated at 130° C., and pressed for 30 minutes at a molding temperature of 130° C. and a molding pressure of 2.0 MPa. Then, it was taken out of the mold, and the area of the press-molded product was divided by the area measured before press molding to calculate the stretching ratio. For the area of the press-molded product, the portions containing only the resin that had flowed out were ignored in determining the area of the press-molded product.

Example 1

The layer shaped body α adopted had a stack structure of ([0/90/0/90/0/90/0]) (hereinafter described as [(0/90)₃/0]) and the layer shaped body β adopted was a nonwoven fabric prepreg with a thickness of 1 mm. Regarding the stretching ratio of stretching layer shaped bodies, the layer shaped body β was found to stretch about 21% less than the layer shaped body α. Layer shaped bodies α and a layer shaped body β were stacked as [α/β/α] to form a laminated base material, which was then pressed in the mold shown in FIG. 7 to provide a fiber reinforced plastic material. The thickness variation of the laminated base material was about 3% at maximum. A reinforcement fiber bundle contained 700 fibers in the layer shaped bodies α whereas reinforcement fiber bundles were not formed in the nonwoven fabric prepreg.

Evaluation results of the molded fiber reinforced plastic material are listed in Table 3. The surface area proportion of the layer shaped body α calculated by equation (I) was 125%.

Example 2

Plies of the incised prepreg B were used as base plies B in the layer shaped body β and both the layer shaped bodies α and the layer shaped bodies β had a stack structure of [(0/90)$_3$/0]. Regarding the stretching ratio of stretching layer shaped bodies, the layer shaped body β was found to stretch about 13% more than the layer shaped body α. Layer shaped bodies α and a layer shaped body β were stacked as [α/β/α] to form a laminated base material, which was then pressed in the mold shown in FIG. 7 to provide a fiber reinforced plastic material. The thickness variation of the laminated base material was about 1% at maximum. Both the number of fibers constituting a reinforcement fiber bundle in the incised prepreg A and the number of fibers constituting a reinforcement fiber bundle in the incised prepreg B were 700.

Evaluation results of the molded fiber reinforced plastic material are listed in Table 3. The surface area proportion of the layer shaped body α calculated by equation (I) was 125%.

Example 3

The layer shaped body α adopted had a stack structure of [(0/90)$_3$/0] and the layer shaped body β adopted was a SMC(A) with a thickness of 1 mm. Regarding the stretching ratio of stretching layer shaped bodies, the layer shaped body β was found to stretch about 26% more than the layer shaped body α. Layer shaped bodies α and a layer shaped body β were stacked as [α/β/α] to form a laminated base material, which was then pressed in the mold shown in FIG. 7 or 8 to provide a fiber reinforced plastic material. The thickness variation of the laminated base material was 2% at maximum. Both the number of fibers contained in a reinforcement fiber bundle in the incised prepreg A and the number of fibers contained in a reinforcement fiber bundle in the SMC(A) were 700.

Evaluation results of the molded fiber reinforced plastic material are listed in Table 3. For both the molds shown in FIGS. 7 and 8, the surface area proportion of the layer shaped body α calculated by equation (I) was 125%.

Example 4

Plies of the incised prepreg C were used as base plies B in the layer shaped body β and both the layer shaped bodies α and the layer shaped bodies β had a stack structure of [(0/90)$_3$/0]. Regarding the stretching ratio of stretching layer shaped bodies, the layer shaped body β was found to stretch about 8% more than the layer shaped body α. Layer shaped bodies α and a layer shaped body β were stacked as [α/β/α] to form a laminated base material, which was then pressed in the mold shown in FIG. 7 to provide a fiber reinforced plastic material. The thickness variation of the laminated base material was about 1% at maximum. The number of fibers constituting a reinforcement fiber bundle in the incised prepreg A and the number of fibers constituting a reinforcement fiber bundle in the incised prepreg C were 700 and 2,900, respectively.

Evaluation results of the molded fiber reinforced plastic material are listed in Table 3. The surface area proportion of the layer shaped body α calculated by equation (I) was 125%.

Example 5

Plies of the incised prepreg D were used as base plies B in the layer shaped body β and both the layer shaped bodies α and the layer shaped bodies β had a stack structure of [(0/90)$_3$/0]. Regarding the stretching ratio of stretching layer shaped bodies, the layer shaped body β was found to stretch about 15% more than the layer shaped body α. Layer shaped bodies α and a layer shaped body β were stacked as [α/β/α] to form a laminated base material, which was then pressed in the mold shown in FIG. 7 or 8 to provide a fiber reinforced plastic material. The thickness variation of the laminated base material was about 1% at maximum. The number of fibers contained in a reinforcement fiber bundle in the incised prepreg A and the number of fibers contained in a reinforcement fiber bundle in the incised prepreg D were 700 and 2,900, respectively.

Evaluation results of the molded fiber reinforced plastic material are listed in Table 3. For both the molds shown in FIGS. 7 and 8, the surface area proportion of the layer shaped body α calculated by equation (I) was 125%.

Example 6

The layer shaped body α adopted had a stack structure of [(0/90)$_3$/0] and the layer shaped body β adopted was a SMC(B) with a thickness of 1 mm. Regarding the stretching ratio of stretching layer shaped bodies, the layer shaped body β was found to stretch about 32% more than the layer shaped body α. Layer shaped bodies α and a layer shaped body β were stacked as [α/β/α] to form a laminated base material, which was then pressed in the mold shown in FIG. 7 or 8 to provide a fiber reinforced plastic material. The thickness variation of the laminated base material was 2% at maximum. The number of fibers contained in a reinforcement fiber bundle in the incised prepreg A and the number of fibers contained in a reinforcement fiber bundle in the SMC(B) were 700 and 2,900, respectively.

Evaluation results of the molded fiber reinforced plastic material are listed in Table 3. For both the molds shown in FIGS. 7 and 8, the surface area proportion of the layer shaped body α calculated by equation (I) was 125%.

Example 7

The layer shaped body α adopted had a stack structure of [(0/90)$_3$/0] and the layer shaped body β adopted was a SMC(B) with a thickness of 1 mm. Regarding the stretching ratio of stretching layer shaped bodies, the layer shaped body β was found to stretch about 32% more than the layer shaped body α. Layer shaped bodies α and a layer shaped body β were stacked as [α/β/α] to form a laminated base material, which was then pressed in the mold shown in FIG. 7 to provide a fiber reinforced plastic material. The thickness variation of the laminated base material was 3% at maximum. The number of fibers contained in a reinforcement fiber bundle in the incised prepreg A and the number of fibers contained in a reinforcement fiber bundle in the SMC(B) were 700 and 2,900, respectively.

Evaluation results of the molded fiber reinforced plastic material are listed in Table 3. The surface area proportion of the layer shaped body α calculated by equation (I) was 125%.

Example 8

Except for using the incised prepreg E instead of the incised prepreg A in layer shaped bodies α, the same procedure as in Example 6 was carried out. Regarding the stretching ratio of stretching layer shaped bodies, the layer shaped body β was found to stretch about 29% more than the layer shaped body α. Layer shaped bodies α and a layer shaped body β were stacked as [α/β/α] to form a laminated base material, which was then pressed in the mold shown in FIG. 7 or 8 to provide a fiber reinforced plastic material. The thickness variation of the laminated base material was 2% at maximum. The number of fibers contained in a reinforcement fiber bundle in the incised prepreg E and the number of fibers contained in a reinforcement fiber bundle in the SMC(B) were 800 and 2,900, respectively.

Evaluation results of the molded fiber reinforced plastic material are listed in Table 3. For both the molds shown in FIGS. 7 and 8, the surface area proportion of the layer shaped body α calculated by equation (I) was 127%.

Example 9

Except for using the incised prepreg F instead of the incised prepreg A in layer shaped bodies α, the same procedure as in Example 6 was carried out. Regarding the stretching ratio of stretching layer shaped bodies, the layer shaped body β was found to stretch about 35% more than the layer shaped body α. Layer shaped bodies α and a layer shaped body β were stacked as [α/β/α] to form a laminated base material, which was then pressed in the mold shown in FIG. 7 or 8 to provide a fiber reinforced plastic material. The thickness variation of the laminated base material was 2% at maximum. The number of fibers contained in a reinforcement fiber bundle in the incised prepreg F and the number of fibers contained in a reinforcement fiber bundle in the SMC(B) were 600 and 2,900, respectively.

Evaluation results of the molded fiber reinforced plastic material are listed in Table 3. For both the molds shown in FIGS. 7 and 8, the surface area proportion of the layer shaped body α calculated by equation (I) was 120%.

Example 10

Except for using the incised prepreg G instead of the incised prepreg A in layer shaped bodies α, the same procedure as in Example 6 was carried out. Regarding the stretching ratio of stretching layer shaped bodies, the layer shaped body β was found to stretch about 29% more than the layer shaped body α. Layer shaped bodies α and a layer shaped body β were stacked as [α/β/α] to form a laminated base material, which was then pressed in the mold shown in FIG. 7 or 8 to provide a fiber reinforced plastic material. The thickness variation of the laminated base material was 2% at maximum. The number of fibers contained in a reinforcement fiber bundle in the incised prepreg G and the number of fibers contained in a reinforcement fiber bundle in the SMC(B) were 1,200 and 2,900, respectively.

Evaluation results of the molded fiber reinforced plastic material are listed in Table 3. For both the molds shown in FIGS. 7 and 8, the surface area proportion of the layer shaped body α calculated by equation (I) was 130%.

Example 11

Except for using the incised prepreg H instead of the incised prepreg A in layer shaped bodies α, the same procedure as in Example 6 was carried out. Regarding the stretching ratio of stretching layer shaped bodies, the layer shaped body β was found to stretch about 27% more than the layer shaped body α. Layer shaped bodies α and a layer shaped body β were stacked as [α/β/α] to form a laminated base material, which was then pressed in the mold shown in FIG. 7 or 8 to provide a fiber reinforced plastic material. The thickness variation of the laminated base material was 2% at maximum. The number of fibers contained in a reinforcement fiber bundle in the incised prepreg H and the number of fibers contained in a reinforcement fiber bundle in the SMC(B) were 1,400 and 2,900, respectively.

Evaluation results of the molded fiber reinforced plastic material are listed in Table 3. For both the molds shown in FIGS. 7 and 8, the surface area proportion of the layer shaped body α calculated by equation (I) was 133%.

Comparative Example 1

Using the same type of continuous fiber prepreg instead of the incised prepreg A in layer shaped bodies α and using the same continuous fiber prepreg as the base material B in layer shaped bodies β, stacks of layer shaped bodies α and layer shaped bodies β having a structure of [(0/90)$_3$/0] were produced. The layer shaped body α and the layer shaped body β had the same stretching ratio. Layer shaped bodies α and a layer shaped body β were stacked as [α/β/α] to form a laminated base material, which was then pressed in the mold shown in FIG. 7 to provide a fiber reinforced plastic material. The thickness variation of the laminated base material was 1% at maximum.

Evaluation results of the molded fiber reinforced plastic material are listed in Table 3.

Comparative Example 2

A laminated base material composed only of layer shaped bodies β of SMC(B) was molded. A laminated base material was produced from three SMC(B) sheets, each with a thickness of 1 mm, stacked one on another. Molding was performed under the same conditions as in Examples. The thickness variation of the laminated base material was 4% at maximum. This laminated base material was pressed using the mold shown in FIG. 7 to produce a fiber reinforced plastic material.

Evaluation results of the molded fiber reinforced plastic material are listed in Table 3.

TABLE 3

| | | Example 1 | Example 2 | Example 3 | Example 4 | Example 5 | Example 6 | Example 7 |
|---|---|---|---|---|---|---|---|---|
| Layer shaped body α | constituent base material | incised prepreg A | incised prepreg A | incised prepreg A | incised prepreg A | incised prepreg A | incised prepreg A | incised prepreg A |
| | incision angle θ [°] | 14 | 14 | 14 | 14 | 14 | 14 | 14 |
| | incision length r [mm] | 1.3 | 1.3 | 1.3 | 1.3 | 1.3 | 1.3 | 1.3 |
| | fiber length L [mm] | 24 | 24 | 24 | 24 | 24 | 24 | 24 |
| | fiber volume fraction [%] | 58 | 58 | 58 | 58 | 58 | 58 | 58 |
| | number of fibers in reinforcement fiber bundle | 700 | 700 | 700 | 700 | 700 | 700 | 700 |
| | number of orientation directions | 1 | 1 | 1 | 1 | 1 | 1 | 1 |
| | thickness or stack structure | [(0/90)$_3$/0] | [(0/90)$_3$/0] | [(0/90)$_3$/0] | [(0/90)$_3$/0] | [(0/90)$_3$/0] | [(0/90)$_3$/0] | [(0/90)$_3$/0] |

TABLE 3-continued

| | | nonwoven fabric prepreg | incised prepreg B | SMC(A) | incised prepreg C | incised prepreg D | SMC(B) | SMC(B) |
|---|---|---|---|---|---|---|---|---|
| Layer shaped body β | constituent base material (base material b) | | | | | | | |
| | fiber length [mm] | 10 | 24 | 30 | 24 | 24 | 30 | 30 |
| | fiber volume fraction [%] | 30 | 53 | 30 | 58 | 53 | 30 | 30 |
| | reinforcement fiber bundle existing or not | X | ○ | ○ | ○ | ○ | ○ | ○ |
| | number of fibers in reinforcement fiber bundle | — | 700 | 700 | 2900 | 2900 | 2900 | 2900 |
| | number of orientation directions | — | 1 | 5 or more | 1 | 1 | 5 or more | 5 or more |
| | thickness or stack structure | 1 mm | [(0/90)₃/0] | 1 mm | 1 mm | 1 mm | 1 mm | 1 mm |
| Structure | stack structure | [α/β/α] | [α/β/α] | [α/β/α] | [α/β/α] | [α/β/α] | [α/β/α] | [α/α/β] |
| | stretching ratio difference | −21 | 13 | 26 | 8 | 15 | 32 | 32 |
| Mold (FIG. 7) | surface quality | Δ | ◎ | ◎ | ◎ | ◎ | ◎ | ○ |
| | defects | Δ | ○ | ◎ | ◎ | ○ | ◎ | ◎ |
| | mechanical properties | ○ | ◎ | ○ | ◎ | ○ | ○ | ○ |
| Mold (FIG. 8) | surface quality | — | — | ◎ | — | ◎ | ◎ | — |
| | defects | — | — | ○ | — | Δ | ◎ | — |
| | mechanical properties | — | — | ○ | — | ◎ | ○ | — |

| | | Example 8 | Example 9 | Example 10 | Example 11 | Comparative Example 1 | Comparative Example 2 |
|---|---|---|---|---|---|---|---|
| Layer shaped body α | constituent base material | Incised prepreg E | Incised prepreg F | Incised prepreg G | Incised prepreg H | continuous fiber prepreg A | SMC(B) |
| | incision angle θ [°] | 14 | 14 | 24 | 14 | — | — |
| | incision length r [mm] | 1.3 | 1.3 | 1.3 | 2.6 | — | — |
| | fiber length L [mm] | 15 | 45 | 24 | 24 | — | 30 |
| | fiber volume fraction [%] | 63 | 50 | 58 | 58 | 58 | 30 |
| | number of fibers in reinforcement fiber bundle | 800 | 600 | 1200 | 1400 | — | 2,900 |
| | number of orientation directions | 1 | 1 | 1 | 1 | — | 5 or more |
| | thickness or stack structure | [(0/90)₃/0] | [(0/90)₃/0] | [(0/90)₃/0] | [(0/90)₃/0] | [(0/90)₃/0] | 1 mm |
| Layer shaped body β | constituent base material (base material B) | SMC(B) | SMC(B) | SMC(B) | SMC(B) | continuous fiber prepreg A | SMC(B) |
| | fiber length [mm] | 30 | 30 | 30 | 30 | — | 30 |
| | fiber volume fraction [%] | 30 | 30 | 30 | 30 | 58 | 30 |
| | reinforcement fiber bundles existing or not | ○ | ○ | ○ | ○ | — | ○ |
| | number of fibers in reinforcement fiber bundle | 2,900 | 2,900 | 2,900 | 2,900 | — | 2,900 |
| | number of orientation direction | 5 or more | 5 or more | 5 or more | 5 or more | — | 5 or more |
| | thickness or tack structure | 1 mm | 1 mm | 1 mm | 1 mm | [(0/90)₃/0] | 1 mm |
| Structure | stack structure | [α/β/α] | [α/β/α] | [α/β/α] | [α/β/α] | [α/β/α] | [α/β/α] |
| | stretching ratio difference | 29 | 35 | 29 | 27 | 0 | 0 |
| Mold (FIG. 7) | surface quality | ◎ | ◎ | ◎ | ◎ | ○ | Δ |
| | defects | ◎ | ◎ | ◎ | ◎ | X | ◎ |
| | mechanical properties | ○ | ○ | ○ | ○ | X | X |
| Mold (FIG. 8) | surface quality | ◎ | ◎ | ◎ | ◎ | — | — |
| | defects | ◎ | ◎ | ◎ | ◎ | — | — |
| | mechanical properties | ○ | ○ | ○ | ○ | — | — |

The invention claimed is:

1. A substantially flat plate-like laminated base material comprising at least a layer shaped body α and a flowable layer shaped body β laid one on the other or side by side,
the layer shaped body α having one or more plies of incised prepreg A each containing unidirectionally oriented reinforcement fibers impregnated with a resin composition, account for a fiber volume fraction of 45% to 65%, and are at least partly cut by a plurality of incisions to a fiber length of 10 to 300 mm, and
the flowable layer shaped body β having one or more plies of base material B each containing reinforcement fibers impregnated with a resin composition and the base material B contains a plurality of unidirectionally paralleled reinforcement fiber bundles and the number of fibers in a reinforcement fiber bundle in the base material B is larger than the number of fibers in a reinforcement fiber bundle in the incised prepreg A,
wherein the base material B is an incised prepreg B with a fiber length of 10 to 300 mm produced by preparing a prepreg containing unidirectionally oriented reinforcement fibers impregnated with a resin composition and cutting all the reinforcement fibers by making a plurality of incisions such that the fiber volume fraction of the incised prepreg B is smaller than the fiber volume fraction of the incised prepreg A, or
the base material B contains reinforcement fiber bundles oriented in five or more directions, and the base material B contains reinforcement fibers with a fiber length of 25 to 50 mm and has a fiber volume fraction of 30% to 45%.

2. A production method for a fiber reinforced plastic material having a stack structure containing convex/concave portions,
comprising a step for preparing the substantially flat plate-like laminated base material according to claim 1, including at least a layer shaped body α and a layer shaped body β laid one on the other or side by side, followed by press-molding at a temperature of T and a pressure of P to produce a fiber reinforced plastic material,
the layer shaped body α having one or more plies of incised prepreg A each containing unidirectionally oriented reinforcement fibers impregnated with a resin composition, account for a fiber volume fraction of 45% to 65%, and are at least partly cut by a plurality of incisions to a fiber length of 10 to 300 mm, the layer shaped body β having one or more base plies B each containing reinforcement fibers with a fiber length of 10 to 300 mm impregnated with a resin composition, and a stretching ratio of the layer shaped body β calculated by dividing an area of the layer shaped body β press-molded singly in a flat plate-like double-side mold at a temperature of T and a pressure of P by its area measured before press-molding, is larger than that of the layer shaped body α calculated in the same manner.

3. The method as set forth in claim 2, wherein the base material B contains a plurality of unidirectionally paralleled reinforcement fiber bundles.

4. The method as set forth in claim 3, wherein the base material B contains reinforcement fiber bundles oriented in five or more directions.

5. The method as set forth in claim 3, wherein the base material B is an incised prepreg B produced by preparing a prepreg containing unidirectionally oriented reinforcement fibers impregnated with a resin composition and cutting all the reinforcement fibers by making a plurality of incisions such that the fiber volume fraction of the incised prepreg B is smaller than the fiber volume fraction of the incised prepreg A.

6. The method as set forth in claim 4, wherein the base material B contains reinforcement fibers with a fiber length of 25 to 50 mm and has a fiber volume fraction of 30% to 45%.

7. The method as set forth in claim 5, wherein the base material B contains reinforcement fibers with a fiber length of 10 to 300 mm and has a fiber volume fraction of 45% to 55%.

8. The method as set forth in claim 3, wherein the number of fibers in a reinforcement fiber bundle in the base material B is larger than the number of fibers in a reinforcement fiber bundle in the incised prepreg A.

9. The method as set forth in claim 2, wherein the surface area of the layer shaped body α in the convex/concave portion-containing face of the fiber reinforced plastic material accounts for 110% to 150% relative to the surface area, which accounts for 100%, of the layer shaped body α in the pressed face of the laminated base material.

10. A substantially flat plate-like laminated base material comprising at least a layer shaped body α and a flowable layer shaped body β laid one on the other or side by side, the layer shaped body α having one or more plies of incised prepreg A each containing unidirectionally oriented reinforcement fibers impregnated with a resin composition, account for a fiber volume fraction of 45% to 65%, and are at least partly cut by a plurality of incisions to a fiber length of 10 to 300 mm, and the flowable layer shaped body β having one or more plies of base material B each containing reinforcement fibers impregnated with a resin composition and the base material B contains a plurality of unidirectionally paralleled reinforcement fiber bundles, wherein the base material B contains reinforcement fiber bundles oriented in five or more directions, and the base material B contains reinforcement fibers with a fiber length of 25 to 50 mm and has a fiber volume fraction of 30% to 45%.

11. The laminated base material as set forth in claim 10, wherein the number of fibers in a reinforcement fiber bundle in the base material B is larger than the number of fibers in a reinforcement fiber bundle in the incised prepreg A.

12. The laminated base material as set forth in claim 10, wherein both surfaces of the laminated base material in the thickness direction are the layer shaped body α.

13. The laminated base material as set forth in claim 10, wherein at least one layer shaped body α contains two or more such plies of incised prepreg A that they are stacked such that the reinforcement fibers in these plies are oriented in different directions.

14. A substantially flat plate-like laminated base material comprising at least a layer shaped body α and a flowable layer shaped body β laid one on the other or side by side, the layer shaped body α having one or more plies of incised prepreg A each containing unidirectionally oriented reinforcement fibers impregnated with a resin composition, account for a fiber volume fraction of 45% to 65%, and are at least partly cut by a plurality of incisions to a fiber length of 10 to 300 mm, and the flowable layer shaped body β having one or more plies of base material B each containing reinforcement fibers impregnated with a resin composition and the base material B contains a plurality of unidirectionally paralleled reinforcement fiber bundles, wherein the base material B is an incised prepreg B with a fiber length of 10 to 300 mm produced by preparing a prepreg containing unidirectionally oriented reinforcement fibers impregnated with a resin composition and cutting all the reinforcement fibers by making a plurality of incisions such that the fiber volume fraction of the incised prepreg B is smaller than the fiber volume fraction of the incised prepreg A.

15. The laminated base material as set forth in claim 14, wherein the number of fibers in a reinforcement fiber bundle in the base material B is larger than the number of fibers in a reinforcement fiber bundle in the incised prepreg A.

16. The laminated base material as set forth in claim 14, wherein both surfaces of the laminated base material in the thickness direction are the layer shaped body α.

17. The laminated base material as set forth in claim 14, wherein at least one layer shaped body α contains two or more such plies of incised prepreg A that they are stacked such that the reinforcement fibers in these plies are oriented in different directions.

18. The laminated base material as set forth in claim 14, wherein at least one layers shaped body β contains two or more such plies of incised prepreg B that they are stacked such that they the reinforcement fibers in these plies are oriented in different directions.

19. The laminated base material as set forth in claim 1, wherein both surfaces of the laminated base material in the thickness direction are the layer shaped body α.

20. The laminated base material as set forth in claim 1, wherein at least one layer shaped body α contains two or more such plies of incised prepreg A that they are stacked such that the reinforcement fibers in these plies are oriented in different directions.

21. The laminated base material as set forth in claim 1, wherein all the layer shaped body α contains two or more such plies of incised prepreg A that they are stacked such that the reinforcement fibers in these plies are oriented in different directions.

22. The laminated base material as set forth in claim 10, wherein all the layer shaped body α contains two or more such plies of incised prepreg A that they are stacked such that the reinforcement fibers in these plies are oriented in different directions.

23. The laminated base material as set forth in claim 14, wherein all the layer shaped body α contains two or more such plies of incised prepreg A that they are stacked such that the reinforcement fibers in these plies are oriented in different directions.

24. The laminated base material as set forth in claim 14, wherein all the layer shaped body β contains two or more such plies of incised prepreg B that they are stacked such that the reinforcement fibers in these plies are oriented in different directions.

25. A molded article comprising the substantially flat plate-like laminated base material as set forth in claim 1.

\* \* \* \* \*